(12) United States Patent
Ulstad et al.

(10) Patent No.: US 10,794,251 B2
(45) Date of Patent: Oct. 6, 2020

(54) FUEL APPORTIONMENT STRATEGY FOR IN-CYLINDER DOSING

(71) Applicant: Caterpillar Inc., Peoria, IL (US)

(72) Inventors: James S. Ulstad, Edwards, IL (US);
Kranti K. Nellutla, Normal, IL (US);
Greg L. Armstrong, Edwards, IL (US);
Steven Y. Tian, Bloomington, IL (US);
Brian P. Brennan, Steger, IL (US);
Sasidhar Rayasam, Peoria, IL (US);
Anand KrishnamurthyGopalan, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 506 days.

(21) Appl. No.: 15/273,264

(22) Filed: Sep. 22, 2016

(65) Prior Publication Data

US 2018/0080358 A1    Mar. 22, 2018

(51) Int. Cl.
*F01N 3/20* (2006.01)
*F02D 41/40* (2006.01)
*F01N 3/023* (2006.01)
*F01N 9/00* (2006.01)
*F02D 41/02* (2006.01)

(52) U.S. Cl.
CPC .............. *F01N 3/206* (2013.01); *F01N 3/023* (2013.01); *F01N 9/002* (2013.01); *F02D 41/029* (2013.01); *F02D 41/405* (2013.01); *F01N 2430/06* (2013.01); *Y02T 10/44* (2013.01); *Y02T 10/47* (2013.01)

(58) Field of Classification Search
CPC .......... F01N 3/023; F01N 3/206; F01N 9/002; F01N 2430/06; F02D 41/029; F02D 41/405; Y02T 10/44; Y02T 10/47
See application file for complete search history.

(56) References Cited

U.S. PATENT DOCUMENTS

| | | | |
|---|---|---|---|
| 6,412,276 B1 | 7/2002 | Salvat et al. | |
| 6,491,016 B1 * | 12/2002 | Buratti | F02D 41/3827 123/299 |
| 6,644,023 B2 | 11/2003 | Hirota et al. | |
| 6,666,020 B2 * | 12/2003 | Tonetti | F02D 41/027 123/299 |
| 7,779,622 B2 | 8/2010 | Kondou et al. | |
| 8,272,207 B2 | 9/2012 | Kurtz | |
| 8,893,474 B2 | 11/2014 | Ikawa et al. | |
| 9,074,549 B1 | 7/2015 | zur Loye | |
| 9,212,613 B2 | 12/2015 | Argolini et al. | |

(Continued)

*Primary Examiner* — Matthew T Largi (57) ABSTRACT

An engine has an injector communicating with a combustion chamber to introduce a plurality of dosing shots to mix with exhaust gases and regenerate an aftertreatment device downstream of the combustion chamber. An apportionment strategy can apportion a per cylinder quantity, representing the quantity of dosing fuel to introduce per cylinder per combustion cycle, among a predefined number of dosing shots each having a first per shot quantity. The strategy compares the predefined number of dosing shots with a temporal dosing window to determine if predefined number of dosing shots can be conducted within the temporal dosing window. If so, the strategy proceeds to introduce the predefined number of dosing shots and if not, the strategy may recalculate a reduced number of dosing shots and reapportions a second per shot quantity.

7 Claims, 3 Drawing Sheets

(56) References Cited

U.S. PATENT DOCUMENTS

| | | | |
|---|---|---|---|
| 9,482,166 B2* | 11/2016 | Richardson | F01N 3/106 |
| 2003/0168039 A1* | 9/2003 | Ebelsheiser | F02B 3/10 |
| | | | 123/299 |
| 2005/0137779 A1* | 6/2005 | Gioannini | F02D 41/029 |
| | | | 701/103 |
| 2007/0062179 A1 | 3/2007 | Leone | |
| 2009/0266060 A1* | 10/2009 | Guo | F02D 41/029 |
| | | | 60/295 |
| 2011/0066354 A1* | 3/2011 | Cassani | F01N 3/0253 |
| | | | 701/103 |
| 2013/0019588 A1 | 1/2013 | Richardson et al. | |
| 2014/0026539 A1* | 1/2014 | Kurtz | F02D 41/024 |
| | | | 60/273 |
| 2017/0152805 A1* | 6/2017 | Schenk | F02D 41/2467 |

* cited by examiner

FUEL APPORTIONMENT STRATEGY FOR IN-CYLINDER DOSING

TECHNICAL FIELD

This patent disclosure relates generally to emissions treatment devices including aftertreatment devices that may be utilized with internal combustion engines and, more particularly, to methods and systems for periodically regenerating such aftertreatment devices.

BACKGROUND

To reduce emissions such as particulate matter like soot and other chemicals that are the byproducts of an internal combustion engine, an emissions treatment device or aftertreatment device may be disposed in the exhaust system of the engine. Examples of such devices include filters and catalysts that can operate by physically trapping the emission products or by chemically reacting with the emission products to convert them to other forms that may be addressed more readily. Periodically, though, it is often required to regenerate the aftertreatment device to remove accumulation therein and to restore the device to an acceptably operational state. Regeneration may be accomplished by oxidizing or burning off the accumulation trapped in the device, which typically involves increasing the temperature or causing combustion to occur inside the device.

Regeneration may be active or passive. Active regeneration applies heat from an external source to raise the temperature in the aftertreatment device while passive regeneration utilizes the preexisting engine and exhaust configuration to oxidize the accumulated matter. One example of passive regeneration is described in U.S. Pat. No. 8,272,207 ("the '207 patent") that describes the regeneration of a particulate filter (PF) used to trap particulate matter. To cause combustion and thus oxidation to occur in the particulate filter, the '207 patent describes introducing additional quantities of fuel to the engine cylinders late in the combustion cycle, for example, by conducting a post injection of fuel occurring after the main injection of fuel has been introduced and ignited. The additional quantity of fuel can be directed in a vaporized state by the exhaust gasses from the cylinder to the particulate filter where the fuel ignites. The present disclosure similarly concerns the use of a post injection of fuel to regenerate an aftertreatment device in the exhaust system associated with an engine.

SUMMARY

The disclosure describes, in one aspect, a method for apportioning dosing fuel to regenerate an aftertreatment device in the exhaust line of an engine. A per cylinder quantity of dosing fuel required to regenerate that aftertreatment device is calculated. The per cylinder quantity is then apportioned among a predefined dosing shot number to determine a first shot quantity of dosing fuel. The predefined dosing shot number is compared to a temporal dosing window representing the beneficial time during the combustion cycle for dosing to occur. If the predefined dosing shot number fits within the temporal dosing window, the method proceeds to dose the predefined number of dosing shots.

In yet another aspect, the disclosure describes an engine that includes a plurality of combustion chambers each having a piston reciprocally movable therein to perform a combustion cycle. The engine is also coupled to an aftertreatment device that may be disposed in an exhaust system communicating with the plurality of combustion chambers. An injector is associated with each of the plurality of combustion chambers and configured to introduce a quantity of dosing fuel for regenerating the aftertreatment device. The engine also includes a controller communicating with the injectors that is configured to calculate a temporal dosing window during the combustion cycle and to apportion the total regeneration quantity of dosing fuel into a first plurality of dosing shots. The controller is further configured to compare the first plurality of dosing shots to the temporal dosing window. If the comparison determines the first plurality of dosing shots fits within the window, the controller directs the injectors to introduce the first plurality of dosing shots.

In a further aspect, the disclosure describes another method of regenerating an aftertreatment device disposed in an exhaust system of an engine. The method determines a total regeneration quantity of dosing fuel required for regeneration of the aftertreatment device and calculates a temporal dosing window during which introduction of dosing fuel to the combustion chamber can occur. The method apportions the dosing fuel into a first plurality of dosing shots set to occur per the combustion cycle and compares the first plurality of dosing shots to the temporal dosing window. If the comparison determines the first plurality of dosing shots can be completed within the temporal dosing window, the method proceeds to dose the first plurality of dosing shots.

DETAILED DESCRIPTION

Figure 1:
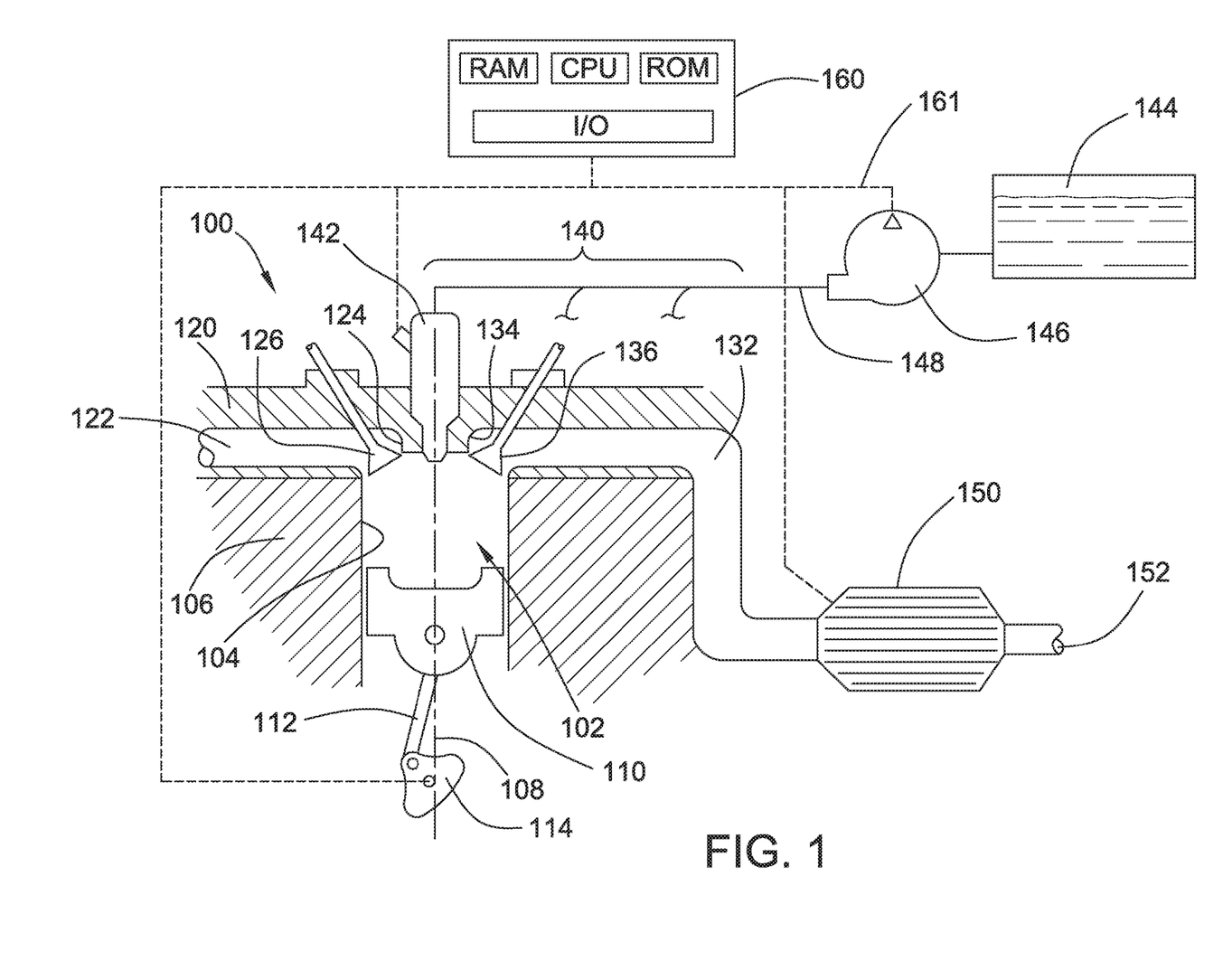
FIG. 1 is a schematic representation of a combustion chamber of an internal combustion engine operatively associated with an aftertreatment device and configured to introduce a plurality of post injection dosing shots of fuel to regenerate the device.

Referring to FIG. 1, wherein like reference numbers refer to like elements, there is illustrated a schematic representation of the engine 100 particularly depicting the combustion chamber 102 of the engine 100 and some associated components to facilitate the combustion process. Although the embodiment of the engine 100 in FIG. 1 is an internal combustion engine, specifically, a diesel-burning, compression ignition engine, other embodiments in other configurations such as gasoline-burning, spark ignition engines, and external combustion engines such as gas turbines and the like, are contemplated. To delineate the combustion chamber 102, an elongated cylinder 104 can be disposed or bored into the material of the engine block 106 and extends along an axis line 108. The combustion chamber 102 therefore assumes a cylindrical shape defined by the walls of the cylinder 104. A piston 110 is reciprocally disposed in the combustion chamber 102 and can make sliding contact with the walls of the cylinder 104 to reciprocally move upwards and downwards along the axis line 108. In particular, the piston 110 can reciprocate between an upward most position, referred to as top dead center (TDC) and a downward most position, referred to as bottom dead center (BDC). The piston 110 is pivotally connected to a connecting rod 112 that is operatively coupled to a rotatable crankshaft 114 that converts the linear reciprocal motion of the piston 110 to rotational, powered motion that is transferable and can be harnessed for work. Rotation of the crankshaft 114 corresponds to the upward and downward motion of the piston 110 in the combustion chamber 102. Crankshaft rotation therefore also corresponds to the strokes of a complete combustion cycle through a familiar relation, such as 0°=TDC start of intake stroke, 180°=BDC start of compression, 360°=TDC start of power stroke, 540°=BDC start of exhaust, and 720°=TDC end of cycle.

To enclose the combustion chamber 102, a cylinder head 120 is secured to the top of engine block 106. To direct intake air to the combustion chamber 102, an intake channel or duct 122 can be disposed through the cylinder head 120 and communicates with an intake port 124 that opens through the cylinder head 120 into the combustion chamber 102. To selectively open and close the intake port 124, an intake valve 126 such as a poppet valve or the like is operatively associated with the intake port 124 and can be selectively actuated by a timing mechanism such as overhead cams synchronized to the combustion cycle of the engine 100. Likewise, to remove the resulting exhaust gasses and combustion byproducts from the combustion chamber 102, an exhaust duct 132 can be disposed in the cylinder head 120 and communicates with the exhaust port 134 that may be selectively opened and closed by an exhaust valve 136.

To introduce fuel to the combustion chamber 102, the engine 100 is operatively associated with a fuel system 140 including a fuel injector 142 that can be secured in the cylinder head 120 and partially disposed into the cylinder 104. The injector 142 is an electromechanical device that can selectively inject or introduce fuel in precise quantities as an atomized jet into the combustion chamber 102 at particular times during the combustion cycle. To supply the fuel, the fuel system 140 can include a fuel reservoir or fuel tank 144 that contains the hydrocarbon-based fuel, such as diesel, in a liquid state or phase. To direct fuel from the fuel tank 144 to the injector 142, a fuel pump 146 can be disposed in a fuel line or fuel channel 148 extending between the fuel tank 144 and the injector 142 that can pressurize and urge flow of the fuel as necessary. The fuel channel 148 may be an opened or closed loop, and the portion of the fuel channel 148 proximate the injector 142 may be referred to as the fuel rail. Although FIG. 1 illustrates a single injector 142 communicating with a single combustion chamber 102, it should be appreciated that in other embodiments the engine 100 can include different chamber and injector combinations in various arrangements, may include multiple injectors per combustion chamber 102, and may have injectors arranged differently with respect to the combustion chamber 102.

To remove particulate matter and other emissions from the exhaust gasses, an aftertreatment device in the embodiment of a particulate filter 150 can be disposed in the exhaust duct 132 downstream from the combustion chamber 102 and upstream of the exhaust orifice 152 that discharges exhaust gasses to atmosphere. The particulate filter 150 is a passthrough device that includes an internal, lattice like structure or baffles (not shown) that may be chemically treated to capture and retain particulate matter from the exhaust gasses directed through it, and which may require periodic regeneration to oxidize the accumulated matter. In addition to the particulate filter 150, other embodiments of aftertreatment devices may be disposed in the exhaust duct 132.

To coordinate and control operation of the engine 100 and related components, the engine 100 may be operatively associated with an electronic control unit, module, or controller 160. The controller 160 monitors various operating parameters and responsively regulates the various components that affect engine operation. The controller 160 can include a microprocessor, an application specific integrated circuit (ASIC), or other appropriate circuitry and can have memory or other data storage capabilities. To monitor and control engine operation, the controller 160 can be in electrical or electronic communication, directly or indirectly, with the engine components via a plurality of electrical communication lines 161 or communication busses that are indicated as dashed lines in FIG. 1. Communication between the controller 160 and the sensors and controls may be established by sending and receiving digital or analog signals along the communication lines. For example, the controller 160 may regulate operation and activation of the fuel injector 142 and may be able to adjust the injection timing and/or injection quantities. The controller 160 can also communicate with the crankshaft 114 to determine speed, the fuel pump 146 to determine fuel pressure, and sensors in the exhaust duct 132 or particulate filter 150 to monitor the exhaust gas composition or conditions.

Using the foregoing information, the controller 160 can responsively regulate the timing of the combustion cycle to facilitate regeneration of the particulate filter 150. For example, referring to FIG. 2, there is illustrated a timing chart 162 comparing operation of the intake and exhaust valves 126, 136 during the combustion cycle as superimposed with fuel injection events from the injector 142 as determined by the controller 160. The chart 162 may be stored as a digital map or executable software program in the controller 160. In the chart 162, with respect to operation of the intake and exhaust valves 126, 136, the Y-axis 164 can represent lift or displacement of the intake and exhaust valves 126, 136 and the X-axis 166 represents the stage of the combustion cycle in units relating to the angular rotation of the crankshaft 114. Additionally, with respect to fuel injection, the Y-axis 164 represents the occurrence of a fuel injection event, with the duration of the fuel injection event indicated with respect to the X-axis 166, that may also be demarcated with respect to the angular rotation of the crankshaft 114 during the combustion cycle. The solid line 170 may represent displacement of the intake valve 126 while the dashed line 172 may represent displacement of the exhaust valve 136.

Figure 2:
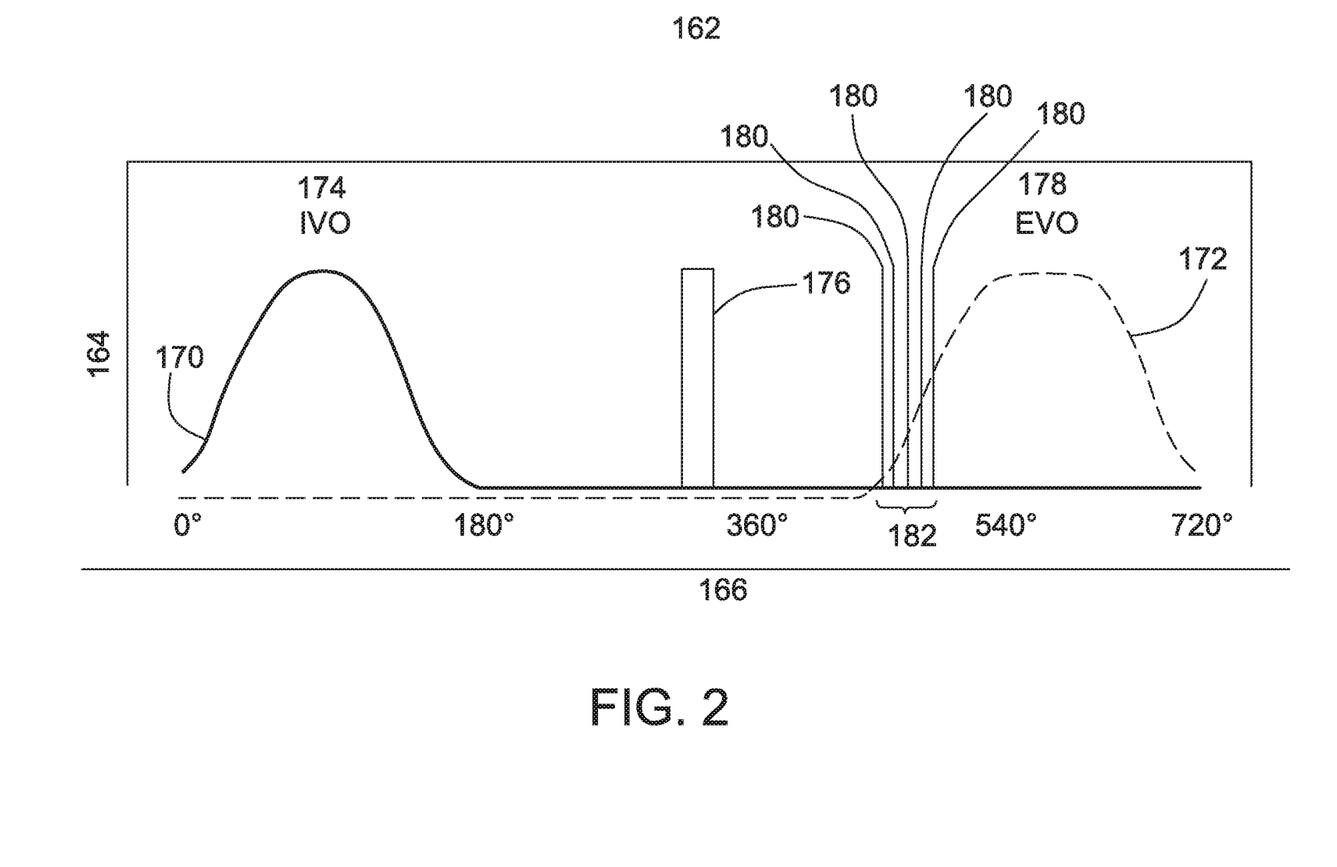
FIG. 2 is a timing chart depicting the relation between the valve timing during the combustion cycle and the main injection and post injection dosing shots of fuel into the combustion chamber.

Referring to FIGS. 1 and 2, during the intake stroke, as the piston 110 moves from the TDC position to the BDC position, the intake valve 126 opens as indicated by the hump-shaped IVO (intake valve opened) curve 174 in solid line 170 to enable air to be drawn into the combustion chamber 102. At approximately 180°, the intake valve 126 closes and the piston 110 begins the compression stroke moving toward the TDC position. A few degrees before the piston 110 reaches TDC at 360°, the injector 142 injects a main injection shot of fuel, as indicated by main injection bar 176 that, when introduced to the elevated pressure in the chamber, ignites and combusts in the main combustion event. The main injection shot 176 may consist of a predetermined quantity of fuel and a predetermined shot duration. The resulting power stroke displaces the piston 110 downward to the BDC position at 540°, during the course of which the exhaust valve 136 may open as indicated by the hump-shaped EVO (exhaust valve opened) curve 178 in dashed line 172. Rising pressure in the combustion chamber 102 due to combustion and the subsequent exhaust stroke of the piston 110 displaces exhaust gasses through the opened exhaust port 134.

To entrain vaporized fuel in the exhaust gasses for passively regenerating the particulate filter 150, the controller 160 can direct the injector 142 to inject one or more post injection shots after the main injection shot in a process referred to as "dosing" or, more specifically, "in-cylinder dosing." In FIG. 2, the smaller bars 180 partially overlapping with the EVO curve 178 represent these dosing shots 180 with each bar representing the occurrence of individual injection or shot of fuel from the injector 142 into the cylinder 104. In the illustrated embodiment, five individual dosing shots 180 are shown, though as explained below this number may vary. Timing of the individual dosing shots 180 may be constrained to occur within a specific time frame, referred to as a temporal dosing window and indicated by bracket 182. If the individual dosing shots 180 are introduced too soon after the main injection shot 176 and the resulting combustion event, the individual dosing shots 180 may ignite and burn in the combustion chamber 102 before reaching the particulate filter 150. If the individual dosing shots 180 are introduced too late, however, the individual dosing shots 180 may not adequately mix with the exhaust gasses being discharged through the exhaust port 134. Further, it has been determined that a majority of exhaust gasses traverse through the exhaust port 134 soon after the opening of the exhaust valve 136 during the early portion of the EVO curve 178; if individual dosing shots 180 are introduced too late, the corresponding dosing fuel may not get discharged from the combustion chamber 102. In addition, because of the electrical power required to activate the injectors 142, it is generally desirable to avoid dosing when injectors 142 in other cylinders 104 might be active to avoid overly straining the electrical system of the engine 100. Accordingly, in the embodiment indicated in FIG. 2, the temporal dosing window 182 may coincide with the later portion of the power stroke just as the exhaust valve 136 opens during the early portion of the EVO curve 178.

To better atomize the dosing fuel, it is advantageous to introduce a plurality of smaller individual dosing shots 180 rather than a single prolonged shot. Additionally, reducing the quantity of dosing fuel per individual dosing shot 180 by, for example, increasing the number of individual dosing shots per combustion cycle, avoids impinging larger droplets of fuel on the walls of the cylinder 104 that could remain after the exhaust stroke and that could contaminate engine oil or oxide incompletely into additional particulate matter in a subsequent combustion cycle. For an engine 100 operating at hundreds or thousands of RPM, each individual dosing shot 180 and the plurality of dosing shots can occur within fractions of a second. However, the maximum number of individual dosing shots 180 possible per combustion cycle are constrained by the temporal dosing window 182, which may be dynamic, varying with the engine speed and the total quantity of dosing fuel required for regeneration.

Figure 3:
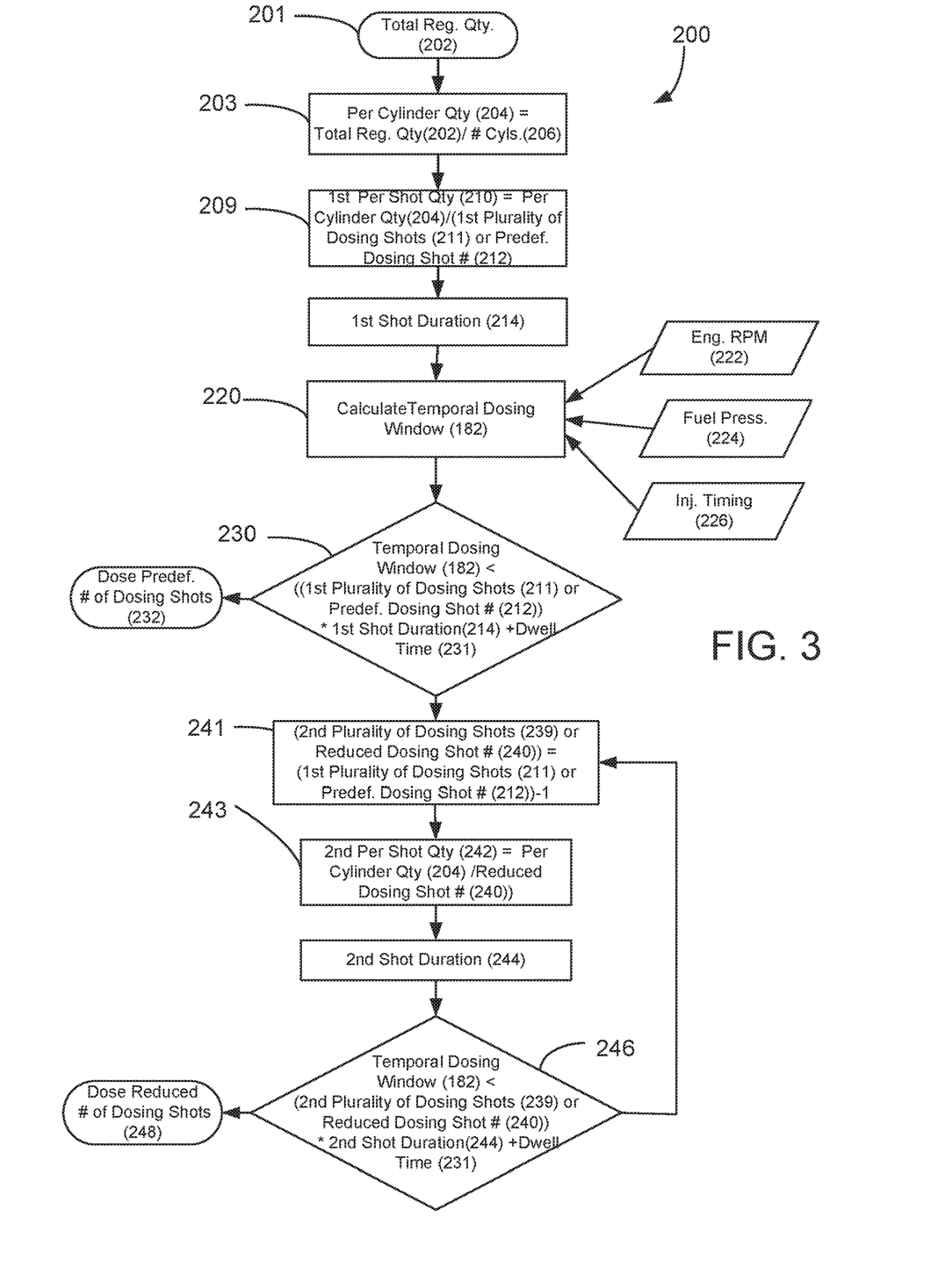
FIG. 3 is a flowchart illustrating a possible strategy for apportioning fuel among a plurality of dosing shots to improve the regeneration process in accordance with the disclosure.

Referring to FIGS. 1 and 3, there is illustrated a strategy 200 for apportioning dosing fuel among a plurality of individual dosing shots 180 to occur within a temporal dosing window 182. The controller 160 associated with the engine 100 in cooperation with the injector 142 can be configured to execute the illustrated strategy 200, which may exist as an executable software program stored in the memory of the controller 160. Although according to the present embodiment the same injector 142 introduces both the main injection shot 176 and the individual dosing shots 180, other embodiments may include a plurality of injectors 142. In an initial step 201, the strategy 200 determines the total regenerative quantity of dosing fuel 202 (Total Reg. Qty) required to regenerate the particulate filter 150. The total regenerative quantity of dosing fuel 202 may depend upon the size of the particulate filter 150, the amount of accumulation therein, and the temperature required for regeneration. The total regenerative quantity of dosing fuel 202 may be a relatively static value compared to the remainder of the strategy 200. In a first calculation step 203, the strategy 200 calculates a per cylinder quantity 204 (Per Cylinder Qty) by allocating the total regenerative quantity of dosing fuel 202 among the number of cylinders 206 (# Cyls.) in the engine 100. The per cylinder quantity 204 therefore represents the amount of dosing fuel that each injector 142 should introduce to their respective cylinders 104 during a combustion cycle.

In a first apportionment step 209, a first per shot quantity 210 (1st Per Shot Qty) is determined by apportioning the per cylinder quantity 204 among a first plurality of dosing shots 211 (1st Plurality of Dosing Shots) to occur per combustion cycle. The first plurality of dosing shots 211 corresponds to the total number of individual dosing shots 180, grouped as a collective, that are desirably introduced per combustion cycle. In a specific embodiment, the first per shot quantity 210 can be apportioned among a predefined dosing shot number 212 (Predef. Dosing Shot #) that corresponds to the first plurality of dosing shots 211, although in other embodiments, the first plurality of dosing shots 211 may be determined differently. The predefined dosing shot number 212 may correspond to the largest number of individual dosing shots 180 per combustion cycle possible under optimal conditions. For example, the predefined dosing shot number 212 may be five. The first per shot quantity 210 represents an initial determination by the strategy 200 of the quantity of dosing fuel to apportion per each dosing shot from the injector 142. For simplicity, the per cylinder quantity 204 may be evenly apportioned among the predefined dosing shot number 212. The strategy 200 also determines a first shot duration 214 (1st Shot Duration) that represents the duration or period of a single individual dosing shot 180. In an embodiment, the first shot duration 214 may be a predetermined value retrieved from a lookup table or map stored in the controller and may be based on various parameters including the construction and capacity of the injector 142, fuel pressure, etc. In other embodiments, the first shot duration 214 can be a calculated value, for example, determined by dividing the first per shot quantity 210 by a shot flow rate representing the amount of fuel discharged from the injector 142 per unit of time, which may be a function of the injector orifice size, fuel pressure in the fuel channel 148, etc.

The temporal dosing window 182 in which to introduce the total number of individual dosing shots 180 per combustion cycle may be a function of the engine speed 222, fuel pressure 224, and injection timing 226 occurring in other combustion chambers, and the temporal dosing window 182 may be determined in calculation step 220 in which those and possibly other factors are accounted for. For example, the engine speed may determine the opening of the exhaust valve 136 and the discharge of exhaust gasses from the cylinder 104, which as stated above constrains the time that the injector 142 has to introduce the dosing shots to the cylinder 104. Also, because the injector 142 is typically connected to the same electrical distribution network as the injectors 142 associated with the other combustion chambers 102 of the engine 100, simultaneous activation of the injectors 142 may strain the electrical distribution network. Accordingly, the temporal dosing window 182 may be affected by and account for the injection timing 226 occurring in other combustion chambers 102. The temporal dosing window 182 therefore represents the portion of the combustion cycle, specifically the power stroke, during which the injector 142 can successfully introduce dosing fuel to the combustion chamber 102 for inclusion in the exhaust gasses being discharged. The strategy 200 via the controller 160 can receive the above factors to calculate the temporal dosing window 182 in the calculation step 220. Moreover, the temporal dosing window 182 and some of the factors it is based upon may be dynamic and change with the operating speed of the engine 100, and thus may be continuously updated so the strategy 200 can recalculate the temporal dosing window 182.

In a window check step 230, the strategy 200 determines if the predefined dosing shot number 212 based on the first per shot quantity 210 corresponds with the temporal dosing window 182 previously calculated. In other words, the window check step 230 determines if the predefined dosing shot number 212 can occur within the time allotted by the temporal dosing window 182. This can be accomplished by comparing the temporal dosing window 182 to the product of the predefined dosing shot number 212 as multiplied by the first shot duration 214. The product of the predefined dosing shot number 212 and the first shot duration 214 can correspond to the time needed to inject the total amount of dosing fuel that is the per cylinder quantity 204 associated with the sum the predefined dosing shot number 212, each shot of which includes the first per shot quantity 210. Further, a dwell time 231 (Dwell Time) representing the intermediate period that may occur between successive individual dosing shots 180 from the injector 142, may be added to the product of the predefined dosing shot number 212 and the first shot duration 214 to more accurately represent the total time the injector 142 requires to complete the predefined dosing shot number 212. If the predefined dosing shot number shots 212 can be completed within the temporal dosing window 182, the strategy 200 proceeds to a step of introducing or, more specifically, dosing the predefined number of dosing shots 232 (Dose Predef. # of Dosing Shots). Dosing the predefined number of dosing shots 232 can be accomplished by having the controller 160 direct the injector 142 to function accordingly. Introducing, or dosing the predefined number of dosing shots 232, is conducted in order to deliver the first per shot quantity 210 as apportioned among the predefined dosing shot number 212, each of which occurs within the first shot duration 214, as those values were determined earlier.

However, if the predefined dosing shot number 212 would not timely fit within the temporal dosing window 182, the strategy 200 proceeds to recalculate the number of individual dosing shots 180 necessary for regeneration to determine a second plurality of dosing shots 239 (2nd Plurality of Dosing Shots) based on the comparison. The second plurality of dosing shots 239 refers to the adjusted number of individual dosing shots 180, as a collective group, that are intended for introduction to a cylinder 104 per combustion cycle. For example, the second plurality of dosing shots 239 can correspond to a reduced dosing shot number 240 (Reduced Dosing Shot #). The reduced dosing shot number 240 can be determined by reducing the predefined dosing shot number 212 by one shot in a subtraction or recalculation step 241. A second per shot quantity 242 (2nd Per Shot Qty) is calculated in a second apportionment step 243 by dividing the per cylinder quantity 204, i.e., the dosing fuel quantity required to be delivered per injector 142 per cycle, by the reduced dosing shot number 240 to apportion the per cylinder quantity 204 among the reduced dosing shot number 240. The strategy 200 also determines a second shot duration 244 (2nd Shot Duration), for example, by retrieving it from a table of predetermined values or possibly by calculation.

In a second window check step 246, the strategy 200 determines if the temporal dosing window 182 corresponds to the reduced dosing shot number 240, for example, by comparing the dosing window 182 to the product of the reduced dosing shot number 240 and the second shot duration 244. Dwell time 231, if available, is also added to the product of the reduced dosing shot number 240 and the second shot duration 244. If the reduced dosing shot number 240 timely fits within the temporal dosing window 182, the strategy 200 proceeds to a step of dosing the reduced number of dosing shots 248 (Dosing Reduced # of Dosing Shots). This can be accomplished by having the controller 160 direct the injector 142 to function accordingly. If, however, the reduced dosing shot number 240 still does not timely match with the temporal dosing window 182, the strategy 200 can be partially repeated by further reducing the number of dosing shots and reapportioning the per shot dosing fuel quantity to determine new numbers for those factors until a match is achieved.

In addition to reducing the number of individual dosing shots 180 introduced per combustion cycle, the strategy 200 in an alternative embodiment may decide to increase the number of individual dosing shots 180. For example, if the strategy 200 is operating on a reduced dosing shot number 240, but other variables change (e.g., engine speed decreases thereby increasing the temporal dosing window 182), the strategy 200 may compare the reduced dosing shot number 240 to the temporal dosing window 182 and determine that additional individual dosing shots 180 could timely fit within the temporal dosing window 182. In such instances, the strategy 200 could devise a second plurality of dosing shots 239 by increasing the number of reduced dosing shot number 240 per combustion cycle by one shot and then calculate a new per shot quantity by reapportioning the per cylinder quantity, i.e., amount of dosing fuel that each injector 142 should introduce per combustion cycle, among the newly calculated second plurality of dosing shots 239. This embodiment may benefit by increasing the number of individual dosing shots 180 delivered by the injector per combustion cycle to improve the atomization of the introduced dosing fuel.

INDUSTRIAL APPLICABILITY

The present disclosure is applicable to passively regenerate an aftertreatment device 150 in the exhaust system of an engine 100. To enable regeneration, a determined quantity of dosing fuel is introduce to the combustion chamber 102 by way of a plurality of post-injection individual dosing shots 180 through selective activation of an injector 142 partially disposed in the combustion chamber 102. To ensure the individual dosing shots 180 intermix and are discharged from the combustion chamber 102 with the exhaust gasses, a temporal dosing window 182 is calculated that represents the optimal time during the combustion cycle for introducing the dosing fuel such that it will not prematurely combust or become trapped in the combustion chamber. The temporal dosing window 182 can be calculated based on a number of factors including engine speed, fuel pressure, and the injection timing occurring in neighboring combustion chambers. In accordance with the disclosure, the temporal dosing window 182 may occur late during the power stroke when the exhaust valve 136 is initially lifted to open the exhaust port 134.

The dosing fuel is allocated into a per cylinder quantity 204 intended to be introduced per injector 142 during each combustion cycle. To maximize the number of individual dosing shots 180 introduced by the injector 142 per combustion cycle, thereby ensuring the dosing fuel is well vaporized in the combustion chamber 102, the per cylinder quantity 204 is further apportioned among a first plurality of dosing shots 211. The first plurality of dosing shots 211 is selected, which in an embodiment may be based on a predefined dosing shot number 212 as described in FIG. 3 that is intended to correspond with a desirably large number of shots to ensure vaporization of the introduced dosing fuel. The first plurality of dosing shots 211 is compared with the temporal dosing window 182 to determine if the first plurality of dosing shots 211 can be introduced during the temporal dosing window. Based on the comparison, the strategy 200 may increase or decrease the first plurality of dosing shots 211 by one shot to calculate a second plurality of dosing shots 239. For example, if the time to inject the first plurality of dosing shots exceeds the temporal dosing window 182, the first plurality of dosing shots 211 may reduced by one shot to determine a reduced dosing shot number 240 as described with respect to FIG. 3. Alternatively, if the first plurality of dosing shots 211 can occur within the temporal dosing window 182, the first plurality of dosing shots 211 may be increased by one shot to increase the total number of individual dosing shots 180 that are introduced per combustion cycle. The newly calculated, second plurality of dosing shots 239 can be re-compared to the temporal dosing window 182 to determine if it will timely fit within the temporal dosing window 182. If the second plurality of dosing shots 239 does not temporally fit with the temporal dosing window 182, the calculations can be repeated to further adjust the number of individual dosing shots 180. By decreasing or increasing the number of individual dosing shots 180 by one shot, a maximum number of individual dosing shots 180 per combustion cycle is closely approximated. The quantity of dosing fuel may also be reapportioned among the second plurality of dosing shots 239. Moreover, the number of individual dosing shots 180 may be recalculated to accommodate changes or adjustments to the speed of the engine 100 or to the dosing fuel requirements.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. An engine comprising:
a plurality of combustion chambers each having a piston reciprocally movable therein to perform a combustion cycle;
an aftertreatment device disposed in an exhaust system communicating with the plurality of combustion chambers;
a plurality of injectors disposed one each in the plurality of combustion chambers to introduce a total regeneration quantity of dosing fuel for regenerating the aftertreatment device;
a controller communicating with the plurality of injectors and configured to calculate a temporal dosing window occurring after an exhaust valve of a combustion chamber opens during the combustion cycle to limit combustion of the dosing fuel and to apportion the total regeneration quantity of dosing fuel into a first plurality of dosing shots; the controller further configured to calculate a per cylinder quantity of dosing fuel based on the total regeneration quantity of dosing fuel and a total number of the plurality of combustion chambers, the controller further configured to compare the first plurality of dosing shots to the temporal dosing window and dosing the first plurality of dosing shots if the comparison determines the first plurality of dosing shots fits the temporal dosing window; the controller further adjusts a number of the first plurality of dosing shots to calculate a second plurality of dosing shots based on the comparison by reducing one shot from the first plurality of dosing shots if the first plurality of dosing shots does not fit the temporal dosing window, and the controller further reapportions the per cylinder quantity among the second plurality of dosing shots.

2. The engine of claim 1, wherein the controller further determines a first shot duration.

3. The engine of claim 2, wherein the controller multiplies the first plurality of dosing shots by the first shot duration when comparing the first plurality of dosing shots with the temporal dosing window.

4. A method of operating an engine, the engine including, a plurality of combustion chambers each having a piston reciprocally movable therein to perform a combustion cycle, an aftertreatment device disposed in an exhaust system, and a plurality of injectors disposed one each in the plurality of combustion chambers to introduce a total regeneration quantity of dosing fuel for regenerating the aftertreatment device, the method comprising:

calculating a temporal dosing window occurring after an exhaust valve of a combustion chamber of the plurality of combustion chambers opens during the combustion cycle to limit combustion of dosing fuel and to apportion the total regeneration quantity of dosing fuel into a first plurality of dosing shots;

comparing the first plurality of dosing shots to the temporal dosing window;

controlling the plurality of injectors to dose the first plurality of dosing shots if the comparison determines the first plurality of dosing shots fits the temporal dosing window;

calculating a per cylinder quantity of dosing fuel based on the total regeneration quantity of dosing fuel and a total number of the plurality of combustion chambers disposed in the engine;

adjusting a number of the first plurality of dosing shots by reducing one shot from the first plurality of dosing shots to calculate a second plurality of dosing shots based on the comparison if the first plurality of dosing shots does not fit the temporal dosing window; and reapportioning the per cylinder quantity of dosing fuel among the second plurality of dosing shots.

5. The method of claim 4, further comprising:

determining a first shot duration.

6. The method of claim 5, wherein comparing the first plurality of dosing shots with the temporal dosing window comprises multiplying the first plurality of dosing shots by the first shot duration.

7. The method of claim 4, wherein reapportioning the per cylinder quantity of dosing fuel among the second plurality of dosing shots comprises dividing the total regeneration quantity of dosing fuel by the second plurality of dosing shots.

* * * * *